United States Patent [19]

Hummel et al.

[11] Patent Number: 4,914,981

[45] Date of Patent: Apr. 10, 1990

[54] INTERMEDIATE TRANSMISSION FOR CONVERTING A ROTATION INTO THE RECIPROCATION OF A ROLLER IN INKING AND/OR DAMPING UNITS OF OFFSET PRINTING PRESSES

[75] Inventors: Peter Hummel, Offenbach am Main; Roland Höll, Weiterstadt, both of Fed. Rep. of Germany

[73] Assignee: Man Roland Druckmaschinen AG, Fed. Rep. of Germany

[21] Appl. No.: 346,809

[22] Filed: May 3, 1989

[30] Foreign Application Priority Data

May 3, 1988 [DE] Fed. Rep. of Germany ....... 3814927

[51] Int. Cl.[4] ......................... F16H 35/08; F16H 1/28

[52] U.S. Cl. ......................................... 74/837; 74/52; 74/835; 475/178

[58] Field of Search ................. 74/828, 831, 835, 836, 74/837, 805, 52

[56] References Cited

U.S. PATENT DOCUMENTS

| | | | |
|---|---|---|---|
| 2,548,217 | 4/1951 | Huck et al. | 74/52 |
| 3,077,159 | 2/1963 | Ward et al. | 74/52 |
| 4,235,129 | 11/1980 | Takasu | 74/805 |
| 4,261,228 | 4/1981 | Eagan, Sr. | 74/835 |

FOREIGN PATENT DOCUMENTS

| | | | |
|---|---|---|---|
| 800264 | 10/1950 | Fed. Rep. of Germany . | |
| 2228939 | 1/1974 | Fed. Rep. of Germany . | |
| 926266 | 5/1963 | United Kingdom | 74/805 |

*Primary Examiner*—Allan D. Herrmann
*Assistant Examiner*—Janice E. Chartoff
*Attorney, Agent, or Firm*—Leydig, Voit & Mayer, Ltd.

[57] ABSTRACT

An intermediate transmission with a variable input-to-output phase relationship for converting rotary motion to reciprocal motion includes a drive shaft having a main portion and an eccentric crank pin, an externally toothed ring with a plurality of circular bores rotatably mounted on the main shaft portion, a control member for rotatably adjusting and locking the ring in selected positions, a disc having an axially extending collar rotatably mounted on the eccentric pin and carrying a plurality of rollers each disposed to roll on the inner surfaces of the respective circular bores, the distance between each roller axis and the respective bore center being equal to the distance between the main shaft axis and the eccentric pin axis, an externally toothed satellite gear mounted on the collar, and an internally toothed sunwheel engaged by the satellite and rotatably mounted in a frame whereby the sunwheel rotates at the reduced integral speed ratio of $1-Z_2/Z_1$ with respect to the main drive shaft where $Z_1$ is the number of teeth on the sunwheel and $Z_2$ is the number of teeth on the satellite gear.

5 Claims, 5 Drawing Sheets

INTERMEDIATE TRANSMISSION FOR CONVERTING A ROTATION INTO THE RECIPROCATION OF A ROLLER IN INKING AND/OR DAMPING UNITS OF OFFSET PRINTING PRESSES

FIELD OF THE INVENTION

The present invention relates generally to transmissions for printing presses and more particularly concerns an intermediate transmission with a variable input-to-output phase relationship for converting rotary motion to reciprocal motion for reciprocating inking and damping rollers and the like in offset printing presses.

BACKGROUND OF THE INVENTION

An intermediate transmission of the general type referred to above is already known in the prior art, such as disclosed in DE-PS 800 264. This intermediate transmission uses a cardan circle pair having an adjustable internally toothed ring. It will be seen that this transmission is very compact and enables the stroke of a reciprocating motion and the input-to-output phase relationship to be varied. A satellite drive by way of a crank pin is received in a compact manner in the adjustable internally toothed ring. Unfortunately, the step-down ratio of the intermediate transmission disclosed in this reference is fixed at 1:2. Only in this way does the point, comprising the output pin of the cardan circular pair, describe on the unit-size satallite a straight line passing through the center of the twice-unit-size internally toothed ring, the said point sliding with the interposition of a slide block in a slot in a rocker. The resulting reciprocating movement with a sliding guide requires some play or freedom of movement which causes unsteadiness and, over time, wear results increasing the unsteadiness. This intermediate transmission with a variable input-to-output phase relationship is therefore unsuitable for high-speed presses.

Other intermediate transmissions which provide a variable input-to-output phase relationship and which have different transmission ratios and rotatably disposed transmission elements adapted to be mounted without clearance and without wear are also known per se, for example, from DE-OS 2,228,939. This reference discloses a transmission having a variable phase relationship for the axial spreading movement of two distributing rollers in the inking units of a printing press, such rollers changing with one another. A serious disadvantage having very important practical consequences is that the drive element of such intermediate transmissions takes up considerable space and cannot therefore be accommodated on the input side of an offset press.

OBJECTS AND SUMMARY OF THE INVENTION

Accordingly, it is the primary aim of the present invention to provide a very compact intermediate transmission in the form of a cardan-like wheel transmission wherein all the transmission elements are rotatably mounted and a preselected speed reduction of other than 1:2 can be easily provided by simply changing the gear teeth ratios of the internal sun and satellite gears.

Pursuant to the present invention, an intermediate transmission with a variable input-to-output phase relationship for converting rotary motion to reciprocal motion of a member disposed outside the transmission for reciprocating an inking or damping roller or the like in an offset printing press having a support frame is provided including a drive shaft having an axis and a main portion journalled in a coaxial bearing at one end and having an eccentric crank pin with a pin axis at the other end, an externally toothed ring rotatably mounted on the main shaft portion, a control disposed on the press frame for rotatably adjusting and locking the ring in selected positions, the ring being formed with a plurality of circular bores each having a center disposed at a predetermined equal spacing from the drive shaft axis and angularly offset from one another by the same angle, a disc having an axially extending collar rotatably mounted on the eccentric pin, a plurality of rollers each having a roller axis disposed on the disc at the same predetermined equal spacing measured from the pin axis and angularly offset from one another by the same angle so that the rollers each roll on the inner surfaces of the respective circular bores, the distance between each roller axis and the respective bore center being equal to the distance between the main shaft axis and the eccentric pin axis, an externally toothed satellite gear mounted on the collar, and an internally toothed sunwheel engaged by the satellite and rotatably mounted in the press frame whereby the sunwheel rotates at the reduced integral speed ratio of $1-Z_2/Z_1$ with respect to the main drive shaft where $Z_1$ is the number of teeth on the sunwheel and $Z_2$ is the number of teeth on the satellite gear.

In the preferred embodiment, the adjusting and locking control includes a pinion or the like disposed on an adjusting shaft rotatably mounted in the press frame, the adjusting shaft being selectively rotatable and lockable from outside the transmission while the press is running to effect changes in the input-to-output phase relationship of the transmission. The sunwheel of the transmission carries an output pin coupled to the member outside the transmission for imparting reciprocating motion thereto and the output pin is radially adjustable for varying the amplitude of the reciprocating motion.

The intermediate transmission according to the invention has substantial advantages. First, it is very compact and can therefore be accommodated on the drive side of an offset press. Also, since it enables play-free wear-resistant bearings to be used throughout—i.e., since the sliding guide on the transmission output element is omitted so that the directions of input and output rotation stay the same—it is very suitable for high-speed presses and can provide a variable, e.g., whole-number, reduction of the rotation, for example, 1:2, 1:3, 1:4 and 1:8 by changing the gear teeth ratios of the internal sun and satellite gears.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
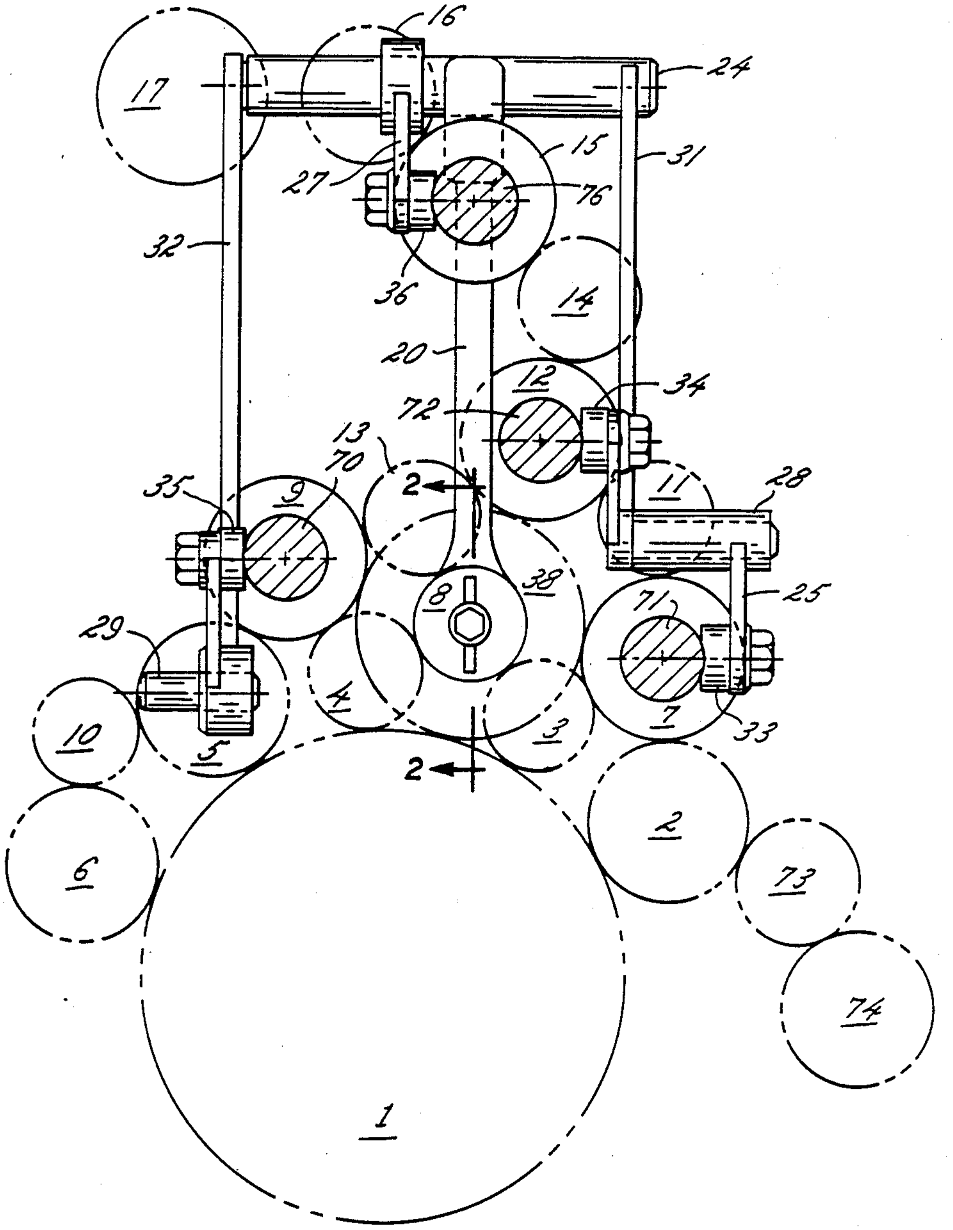
FIG. 1 is a schematic side elevation of a printing unit having a distributing roll drive in an inking unit of an offset printing press.

Turning now to FIG. 1 of the drawings, a side elevation of a distributing roll drive for an inking unit of an offset printing press is shown in generally schematic fashion with the various ink distributing and transfer rolls shown in broken lines.

A rockable vibrator roll 16 picks up fresh printing ink from a driven ductor roll 17 of an offset press and transfers the ink to a distributing roller 15. The ink flow proceeds therefrom by way of an ink feeder roller 14 to another distributing roller 12 which subdivides the ink flow into two subflows, one going to a branch roller 11 and the other to a branch roller 13. The first subflow goes by way of the roller 13 and an ink-conveying roller 8 to two front inking rollers 3 and 4. The second subflow goes by way of the branch roller 11 and a distributing roller 7 to the first inking roller 3 and also to another inking roller 2. The rollers 2, 3 and 4 ink an offset plate clamped on a plate cylinder 1. The second inking roller 4 is followed in the direction of plate cylinder rotation by a rear inking roller 5 and, optionally by a further inking roller 6. Another distributing roller 9 rolls on the rollers 4 and 5 and a plastic-covered ink-conveying roller 10 is positioned as rider roller on the rollers 5 and 6. A central gear 38 disposed between the distributing rollers 7, 9 and 12 rotates the same and is driven by the plate cylinder 1. Another gear (not shown) drives the distributing roller 15.

Figure 2:
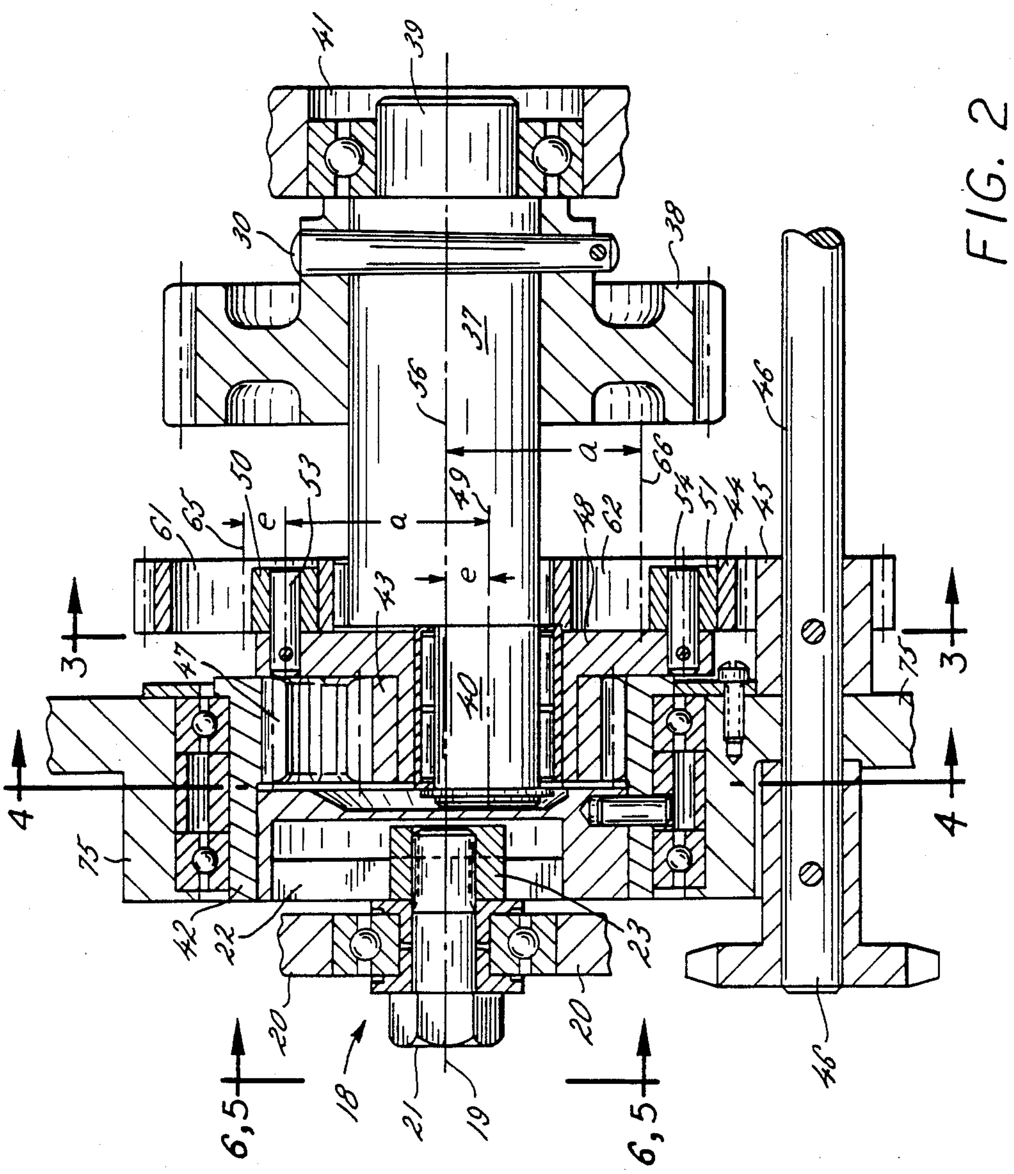
FIG. 2 is a longitudinal section, with certain portions broken away, of the intermediate transmission according to the present invention.
Figure 3:
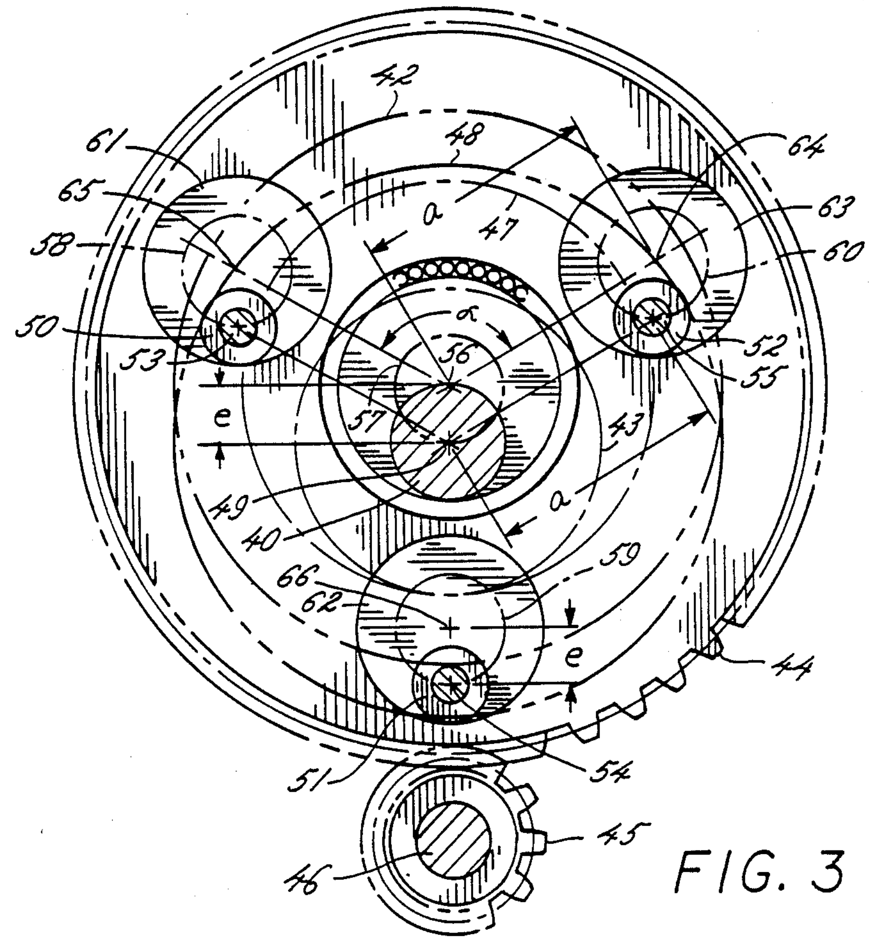
FIGS. 3 and 4 are cross-sectional views of the transmission substantially as seen along lines 3—3 and 4—4, respectively, in FIG. 2; and, FIGS. 5 and 6 are similar fragmentary cross-sectional views of the output end of the transmission substantially as seen along lines 5—5 and 6—6, respectively, in FIG. 2 with FIG. 5 showing the output pin in its zero stroke position and FIG. 6 showing the output pin in a position stroke position.
Figure 4:
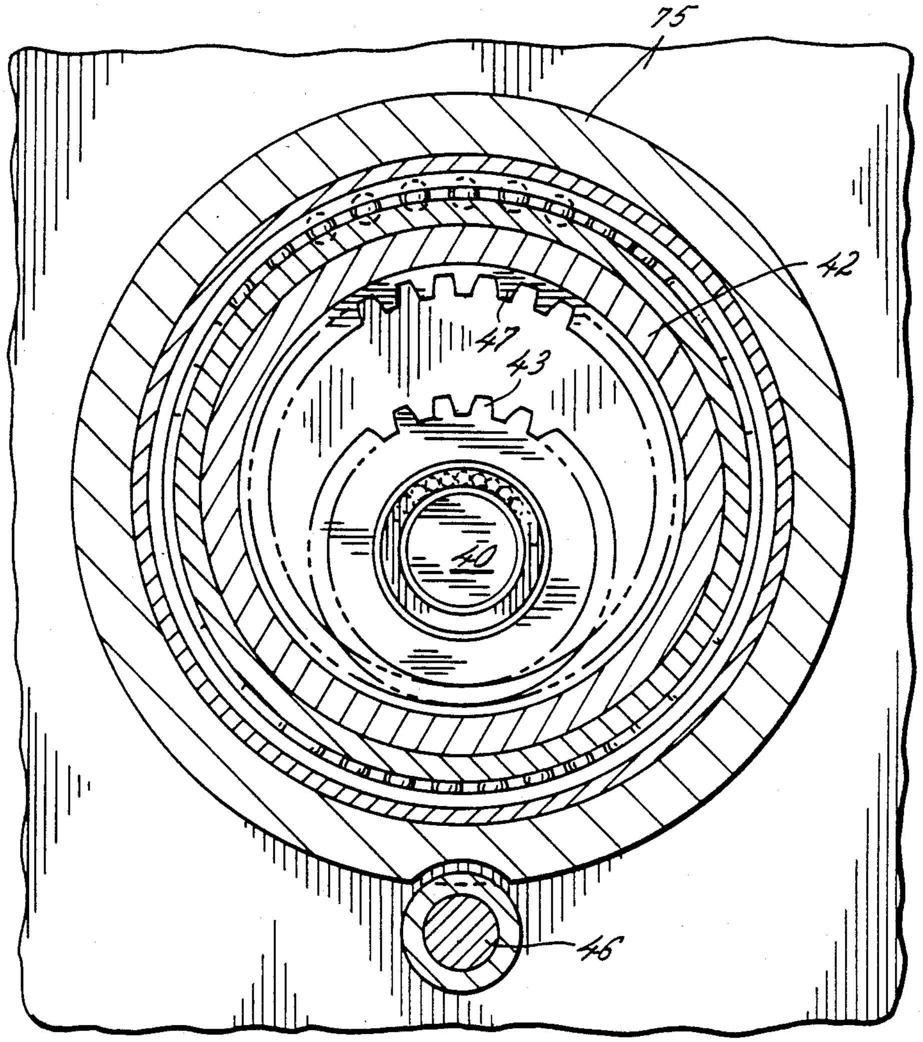
Figure 6:
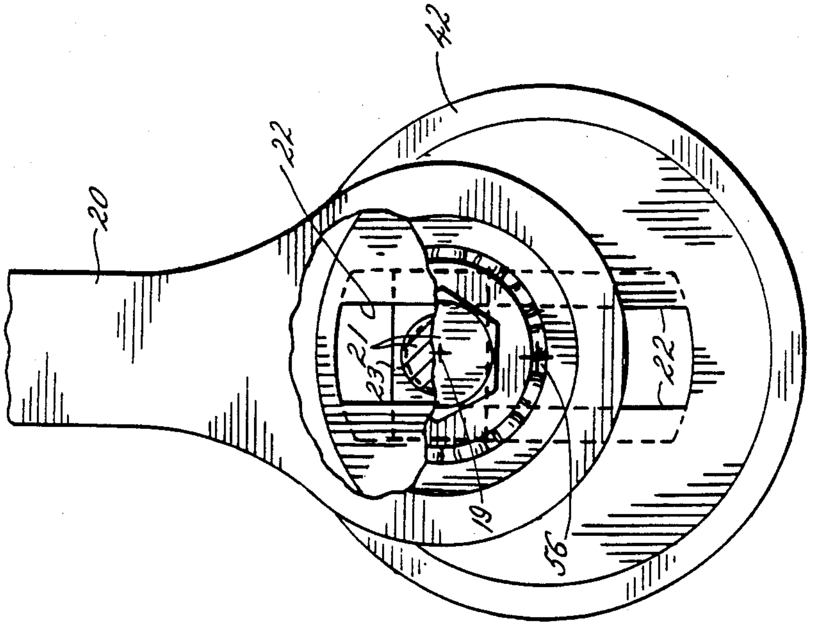

In accordance with the present invention an intermediate transmission converts the rotary motion of the central gear 38 into axial reciprocation of the rollers 7, 9, 12 and 15. Referring to FIGS. 2, 3 and 4, the central gear 38 is secured by a pin 30 to the main portion of a drive shaft 37 having an axis 56 and one end 39 journalled in a coaxial bearing disposed in the press frame 41. The other end of the drive shaft 37 is formed as an eccentric pin 40 having a pin axis 49 and carries an axially flanged disc 48 on which an externally toothed satellite gear 43 is mounted, as described in more detail below.

A toothed ring 44 is also rotatably mounted on the main portion of the drive shaft 37 with the interposition of bearings and is adjustable by way of toothing on its outer contour and of a pinion 45 meshing with the toothing. In the preferred embodiment, the pinion 45 is secured to an adjusting shaft 46 rotatably mounted in a retaining plate 75 of press frame 41, the shaft 46 being adapted to be rotated externally by hand or by motor means while the press is running and to be lockable in the position into which it is adjusted. It will be understood, of course, that instead of the pinion 45, some other self-locking or similar element such as a worm can be used which cooperates self-lockingly with worm wheel toothing on the toothed ring 44. Another alternative is to use a sprocket instead of the pinion 45 to drive the shaft 46.

According to the invention, the ring 44 is formed at a spacing a around axis 56 of the coaxial drive shaft 37 with a plurality of bores 61-63, which are offset from one another by the same angle. For example, the three bores 61-63 which can be seen in FIG. 3 are at an offset at an angle of 120° from one another. The satellite 43 is fixedly disposed on a shouldered collar of a disc 48 rotatably mounted on the eccentric drive shaft pin 40. Disposed on the disc 48 at the same spacing a around the pin center 49 are a plurality of rollers 50-52 which are also disposed at the same angular offset $\alpha=120°$ from one another. The rollers 50-52 roll on the inside surfaces of the bores 61-63 and their axes 53-55 each describe an orbit 58-60.

In keeping with the invention, the distance between, on the one hand, the centers 64-66 of each bore 61-63 and, on the other hand, the axes 53-55 of each roller 50-52 must be equal to the distance e between the drive shaft axis 56 and the axis 49 of the eccentric pin 40 if the transmission is to provide satisfactory conversion. The radius of the bores 61-63 is therefore calculated from the sum of the eccentricity of the satellite 43 and the radius of the rollers 50-52.

A sunwheel 42 which has internal toothing 47 and which meshes with the satellite 43 is rotatably mounted, as the output member of the transmission, in registration with the toothed ring 44. To convert the rotation of the sunwheel 42 into axial variable-stroke reciprocation of distributing rollers 7, 9, 12 and 15, for example, the distributing rollers in damping and inking units of offset presses, a threaded, nut-like slide block 23 is so guided in a groove 22 in the sunwheel 42 as to be adjustable and securable by a screw 21. Rotatably mounted thereon with the interposition of a bearing is a rocker 20 whose motion is in known manner transmitted by way of coupling elements 24-29 and 31-36 to journals 70-72 and 76 of the distributing rollers 7, 9, 12 and 15.

When the drive shaft 37 rotates and the toothed ring 44 is blocked from rotation by the pinion 45, a uniform step-down is produced in the intermediate transmission. The amount of stepdown is calculated from 1 minus the quotient of the tooth number $Z_2$ of the satellite 43 and the tooth number $Z_1$ of the sunwheel 42. For example, when $Z_1=32$ and $Z_2=24$ a stepdown of 1:4 is produced, calculated from 1 minus $24 \div 32 = 0.25$. It will be understood, of course, that different step-down ratios can be selected by changing the tooth rotors of the sunwheel 42 and the satellite gear 43 without impairing the quality of the transmission provided by the very compact cardan-like wheel transmission. When any minor clearance initially present when the rollers 50-52 run on to the surface of the bores 61-63 has been eliminated, the internal transmission runs quietly and without play at a constant step-down.

While the drive shaft 37 rotates, the rollers 50-52 prevent the satellite 43 from turning on the eccentric pin 40 since the rollers 50-52 bear in the bores 61-63 in the gear 44 and roll uniformly on the surface of the latter bores. Consequently, the center of the satellite 43, which is also the center 49 of the eccentric pin 40, rotates in an orbit 57 whose radius corresponds to the eccentricity e (crank circle). It will also be seen that in addition to the eccentric pin center 49, the axes 53-55 of the rollers 50–51 describe an orbit 58–60 whose radius also corresponds to the eccentricity e. Accordingly, the transmission of the satellite 43 which rotates in this way is transmitted to the sunwheel 42 in the same direction of rotation.

When the toothed ring 44 is moved into a different angular position relatively to the central gear 38—i.e., relatively to the plate cylinder drive gear meshing with the central gear 38—by the pinion 45 being rotated by means of the shaft 46, the phase relationship between input and output varies. However, the crank drive 18, or a similar drive producing a reciprocation, coupled to the output of the rotating sunwheel 42 is unaffected so far as the stroke of the movement is concerned. Consequently, the phase relationship and the amplitude of the reciprocating motion can be adjusted independently of one another. The significance of this feature is described in the above-mentioned reference DE-OS 2,228,939.

Figure 5:
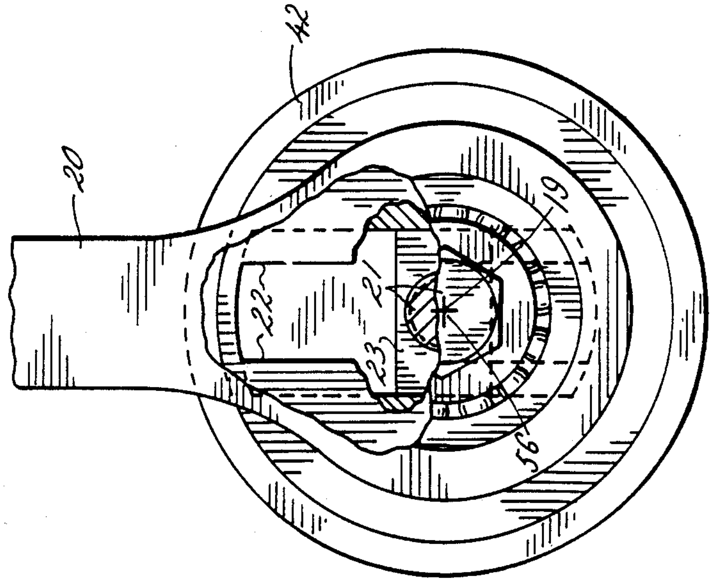

When the crank drive 18 is in the position shown in FIGS. 2 and 5, there is no movement of the rocker 20—i.e., no reciprocating motion can be produced. The reason is that, with the transmission in this neutral position, the screw output axis 19 is in alignment with the input shaft axis 56.

Pursuant to a further feature of the invention, the position of the output axis 19 relative to the input axis 56 can be varied by shifting and locating the input axis 19 of the lever 20 rotatably mounted on the screw 21 together with the threaded, nut-like slide block 23 in the sunwheel groove 22. Depending upon the amplitude of the eccentricity in the crank drive 18—i.e., upon the selected crank radius—the reciprocating motion is initiated independently of the phase relationship provided by the intermediate transmission.

Transmission of the motion of the rocker 20 to journals 70–72 and 76 of the distributing rollers 7, 9, 12 and 15 to reciprocate the same is known in the prior art and will be described only briefly hereinafter. The reciprocating drive is provided by the members previously referred to as coupling elements 24–36—i.e., conventional rockers 25–27 mounted on the press frame 41 by means of pivots 24, 28 and 29 and bearings. The rockers 25, 26 are moved by way of associated linkages 31, 32 and the rocker 27 is moved directly by the journal 24 to which the rocker 20 is connected. Rollers 33–36 are mounted on the rockers 25–27 and in known manner engage, in a manner not shown in further detail, in a pair of guide discs disposed on each distributing roller journal 70–72, 76.

The intermediate transmission according to the invention which provides a variable input-to-output phase relationship can also be used, if the crank drive 18 is replaced by a known cam transmission (not shown) to convert a rotation into the vibrating movement of a vibrator with a variable phase relationship, for example, in inking units. To this end, the cam is secured to the sunwheel 42 and cam movement is in known manner transmitted to a cam follower lever (not shown) connected to the vibrator spindle. Another possible use would be the control of stepping movements of elements, such as the stepping-on of a ductor roll in inking units.

From the foregoing description, it will be appreciated that the cardan-like intermediate transmission according to the present invention is of general use for purposes requiring substantial transmission ratios where it is required, with very reduced use of space, to vary the timing of a device connected to the intermediate transmission with the machine running but without the adjustment affecting the amplitude of the reciprocation.

We claim as our invention:

1. An intermediate transmission with a variable input-to-output phase relationship for converting rotary motion to reciprocal motion of a member disposed outside the transmission for reciprocating an inking or damping roller or the like in an offset printing press having a support frame, comprising in combination, a drive shaft having an axis and a main portion journalled in a coaxial bearing at one end and having an eccentric crank pin with a pin axis at the other end, an externally toothed ring rotatably mounted on said main shaft portion, means disposed on the press frame for rotatably adjusting and locking said ring in selected positions, said ring being formed with a plurality of circular bores each having a center disposed at a predetermined equal spacing from said drive shaft axis and angularly offset from one another by the same angle, a disc having an axially extending collar rotatably mounted on said eccentric pin, a plurality of rollers each having a roller axis disposed on said disc at said predetermined equal spacing measured from said pin axis and angularly offset from one another by said same angle so that said rollers each roll on the inner surfaces of said respective circular bores, the distance between each roller axis and the respective bore center being equal to the distance between the main shaft axis and the eccentric pin axis, an externally toothed satellite gear mounted on said collar, and an internally toothed sunwheel engaged by said satellite and rotatably mounted in said press frame whereby said sunwheel rotates at the reduced integral speed ratio of $1\text{-}^{Z}2/_{Z1}$, with respect to said main drive shaft where $Z_1$ is the number of teeth on the sunwheel and $Z_2$ is the number of teeth on the satellite gear.

2. An intermediate transmission as defined in claim 1 wherein said adjusting and locking means includes a pinion or the like disposed on an adjusting shaft rotatably mounted in the press frame, said adjusting shaft being selectively rotatable and lockable from outside the transmission while the press is running to effect changes in the input-to-output phase relationship of the transmission.

3. An intermediate transmission as defined in claim 1 including means coupled to said sunwheel for rotation therewith and for carrying an output pin coupled to said member outside the transmission for imparting reciprocating motion thereto.

4. An intermediate transmission as defined in claim 3 wherein said coupling means includes a member defining a radially extending groove and a slide block adjustably disposed in said groove which carries said output pin for varying the amplitude of said reciprocating motion.

5. An intermediate transmission as defined in claim 4 wherein said output pin comprises an adjusting screw and said slide block includes a threaded, nut-like portion clampable against said member defining said groove.

* * * * *